United States Patent

[11] 3,575,570

| [72] | Inventors | John S. Gellatly<br>Lagrange;<br>James C. Houda, Jr, Downers Grove, Ill. |
|---|---|---|
| [21] | Appl. No. | 781,841 |
| [22] | Filed | Dec. 6, 1968 |
| [45] | Patented | Apr. 20, 1971 |
| [73] | Assignee | Western Electric Company, Incorporated<br>New York, N.Y. |

[54] APPARATUS FOR FABRICATING A CONTACT ON AN ELECTRICALLY CONDUCTING MEMBER
10 Claims, 14 Drawing Figs.

[52] U.S. Cl. .................................................... 219/80,
219/78, 219/91
[51] Int. Cl. .................................................... B23k 9/12,
B23k 11/00
[50] Field of Search .......................................... 219/80, 79,
78, 119, 91

[56] References Cited
UNITED STATES PATENTS

| 2,388,754 | 11/1945 | Martindell ..................... | 219/79 |
| 2,801,328 | 7/1957 | Clough et al. ................. | 219/79 |
| 3,319,038 | 5/1967 | Meister et al. ................ | 219/79 |
| 3,382,575 | 5/1968 | Gannoe ........................ | 219/79X |

Primary Examiner—J. V. Truhe
Assistant Examiner—Hugh D. Jaeger
Attorneys—H. J. Winegar, R. P. Miller and A. C. Schwarz, Jr ABSTRACT: Apparatus for fabricating a contact on an electrically conducting member, such as one of a plurality of elongated wire springs of a terminal connector block assembly, includes a first shearing member having a shearing edge and a gauging surface engageable with a side of the wire spring for locating it relative to the shearing edge. A contact tape is fed so that a leading end portion thereof projects beyond the shearing edge transversely of the wire spring. The leading end portion of the contact tape and the wire spring then are welded to one another so that the contact tape extends across the wire spring a preselected distance relative to a side of the wire spring. The welded contact tape and the wire spring next are moved relative to the first shearing member to bring the side of the wire spring against the gauging surface of the first shearing member. A second shearing member then cooperates with the shearing edge of the first shearing member to shear off the leading end portion of the contact tape substantially flush with the side of the wire spring, to form a contact thereon.

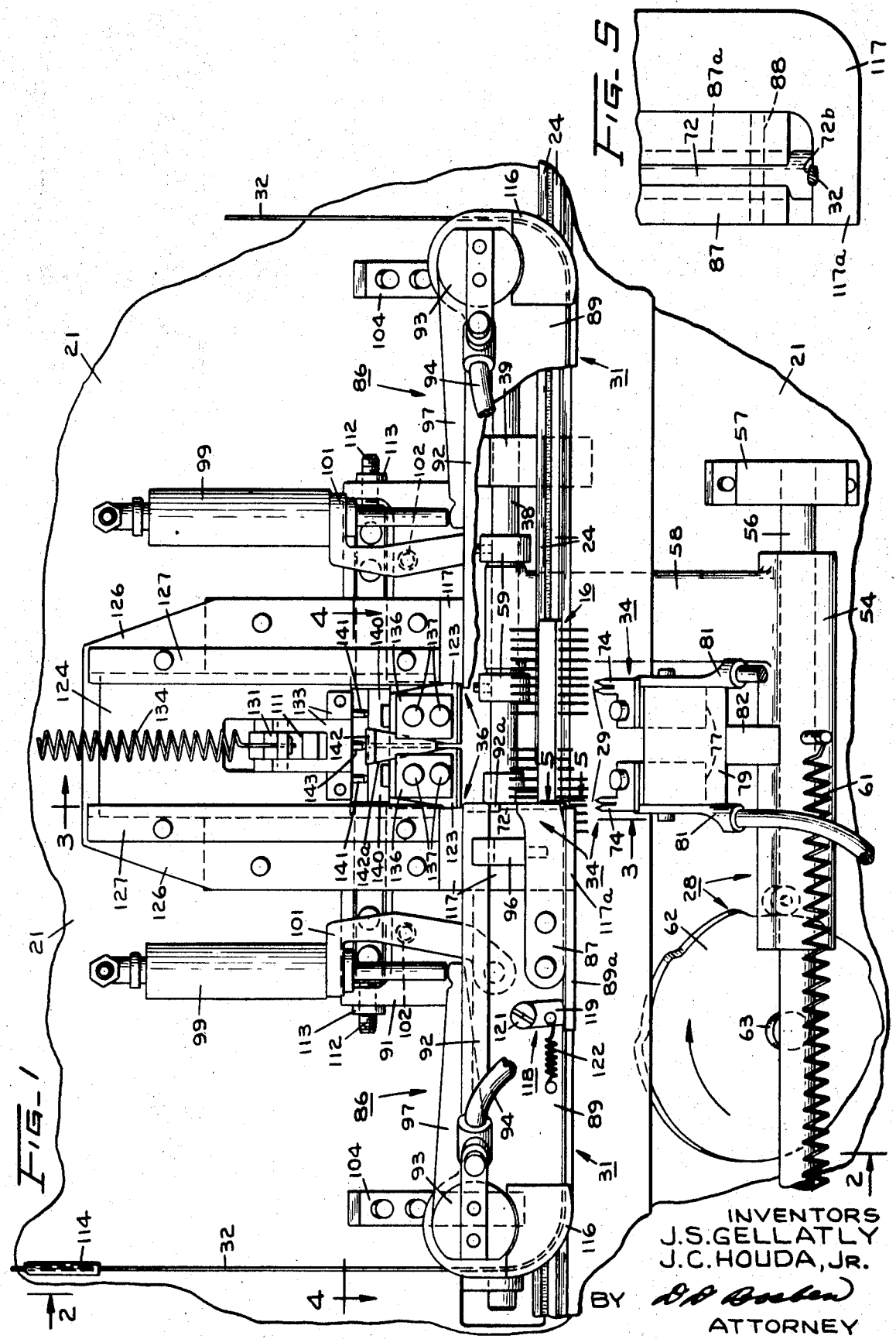

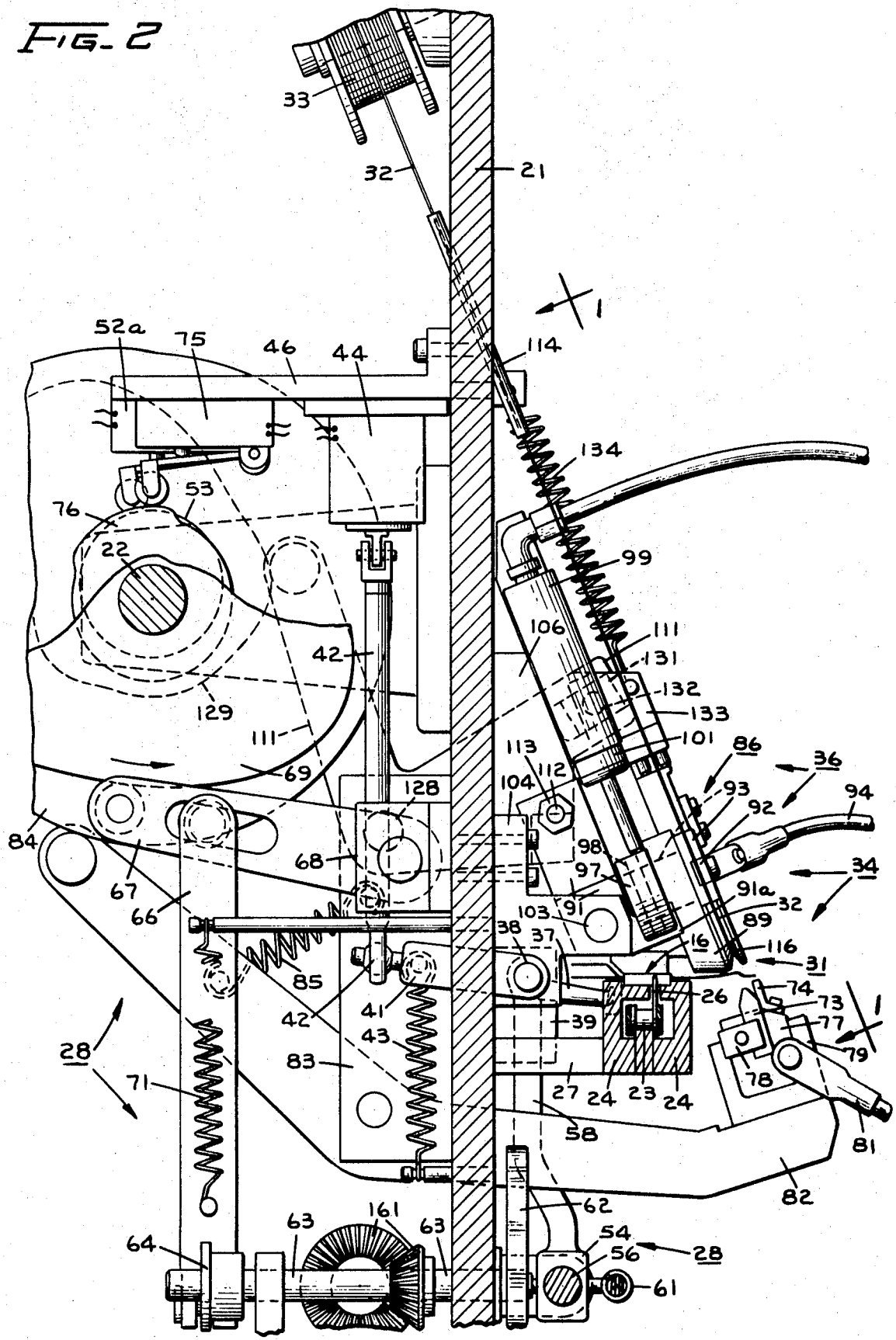

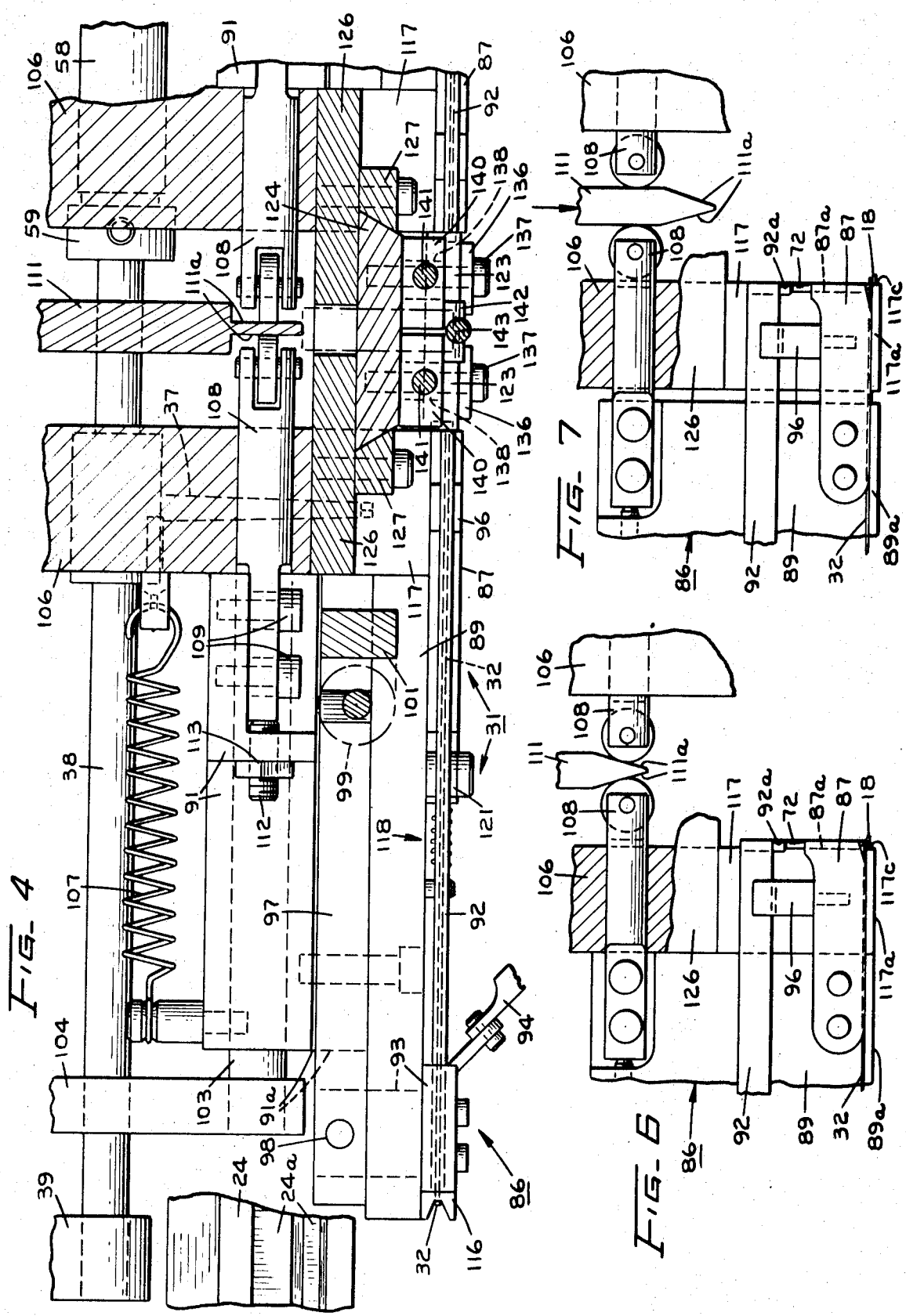

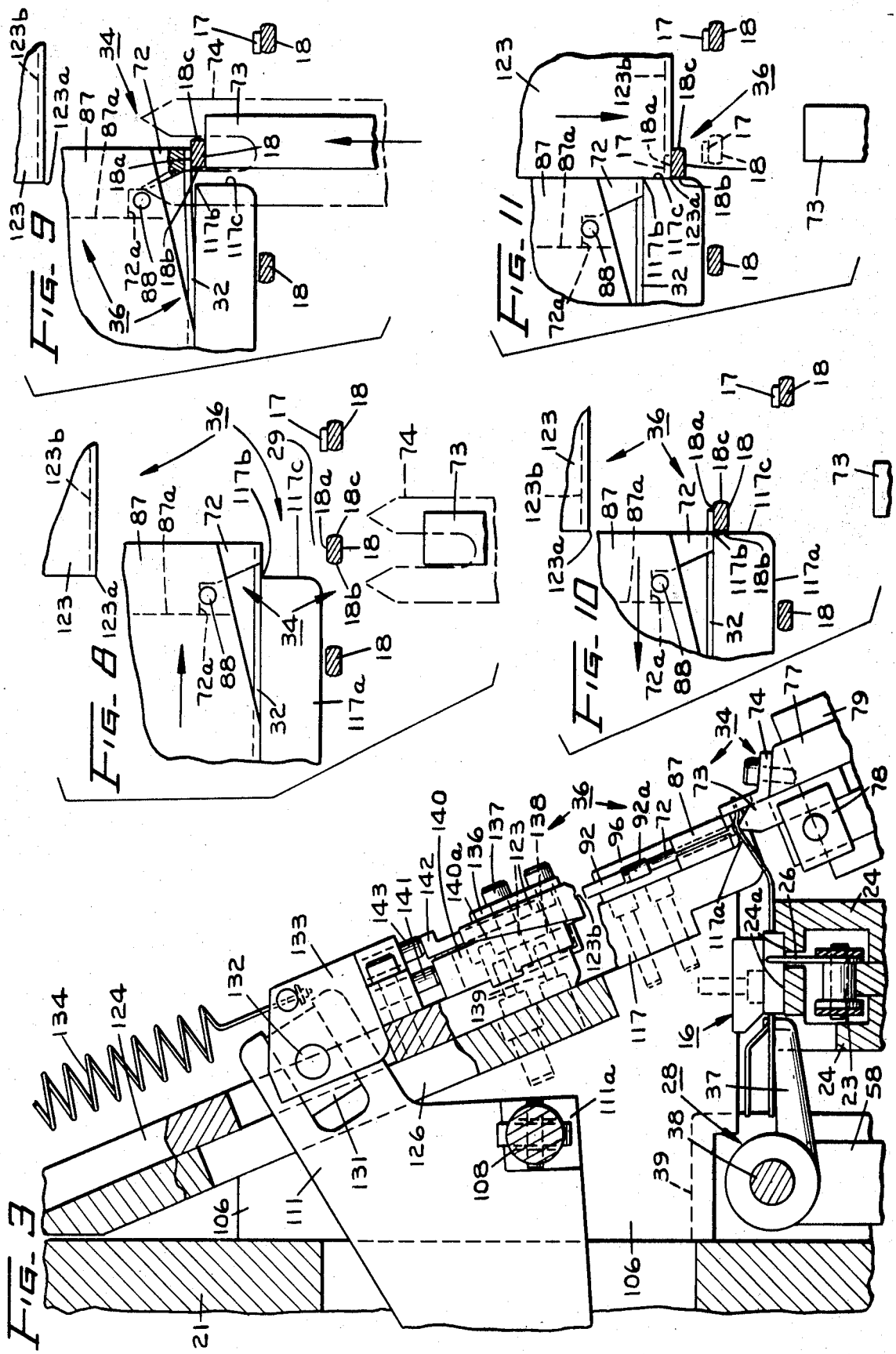

APPARATUS FOR FABRICATING A CONTACT ON AN ELECTRICALLY CONDUCTING MEMBER

BACKGROUND OF THE INVENTION

1. Field of the Invention

This invention relates to the fabrication of a contact on an electrically conducting member, and more specifically to the fabrication of a contact on a wire spring of a terminal connector block assembly.

In certain terminal connector block assemblies, such as are used in electronic telephone switching systems and in which a plurality of parallel wire springs are embedded in a plastic body member and project from opposite sides of the body member, it is necessary to provide a precious metal contact on a coined portion of each of the wire springs at a point spaced from its outer end. The contact, which does not extend across the entire width of the coined portion, so as to conserve precious metal, must be located on the coined portion within close tolerances, such as five thousandths of an inch, so that when the connector block assembly is subsequently assembled with a printed circuit board the contact will be substantially centered with respect to an associated land area on the circuit board.

2. Description of the Prior Art

In known apparatus for providing precious metal contacts on wire springs of a terminal connector block assembly, the contacts are precut from a contact tape. Each contact subsequently is fed into welding position on a reciprocating welding electrode and welded to one of the wire springs in substantially centered relationship with respect to the wire spring.

One disadvantage of this arrangement is that is frequently is difficult to cut the contacts to the same preselected size with any degree of consistency. Other disadvantages of this type of apparatus include its relatively slow operating cycle, difficulty in accurately locating the contact on the wire spring, and abrasion of the wiping surface of the contact during the handling and welding thereof.

Apparatus also is known in which a contact tape is advanced longitudinally from a continuous supply to feed an end portion of the tape parallel to the longitudinal axis of a wire spring and into juxtaposed relationship with the portion of the wire spring to which it is to be attached, whereupon the contact tape portion and the wire spring portion are clamped between relatively movable welding electrodes. In one known apparatus of this type, the contact tape and wire spring portions then are welded to one another, after which the contact tape is severed beyond the end of the wire spring by relatively movable shearing members to form a contact of a preselected length on the wire spring. In another known apparatus of this type, the contact tape first is severed by a single shearing member, utilizing the spring as an anvil, to form a contact portion of a preselected length. The severed contact portion then is welded to the spring by the electrodes.

These latter apparatus, however, are not particularly suitable for providing a contact on a spring where the contact is to be located accurately on a portion of the spring spaced from its adjacent end. For example, the apparatus in which the relatively movable shearing members sever the contact tape beyond the outer extremity of the spring is designed for providing a contact at the extremity of the spring, while the apparatus utilizing the spring as an anvil during the contact tape severing operation is undesirable because of the inherent danger of damaging the spring as the contact tape is being cut. Further, in either apparatus difficulty may arise in feeding the leading end portion of the contact tape into proper longitudinal alignment with the spring within the desired tolerances.

SUMMARY OF THE INVENTION

An object of the invention is to provide new and improved apparatus for fabricating a contact on an electrically conducting member.

Another object of the invention is to provide new and improved apparatus for fabricating a contact on an elongated electrically conducting member at a point intermediate its ends.

A further object of the invention is to provide new and improved apparatus for fabricating a contact of preselected size on an electrically conducting member.

A still further object of the invention is to provide new and improved apparatus for fabricating a contact on an electrically conducting member so that the contact is located accurately in a desired position on the electrically conducting member.

In accordance with the invention, apparatus for fabricating a contact on an electrically conducting member includes first and second relatively movable shearing members, the first shearing member having a shearing edge and a gauging surface for locating the electrically conducting member relative to the shearing edge. Means are provided for feeding a contact tape so that a leading end portion thereof projects beyond the shearing edge of the first shearing member, and for welding the leading end portion to the electrically conducting member so that the contact tape extends across the electrically conducting member a preselected distance relative to a surface thereof. Means next cause movement of the welded contact tape and the electrically conducting member to bring the surface of the electrically conducting member into engagement with the gauging surface of the first shearing member. Relative movement then is caused between the shearing members to shear off the welded leading end portion of the contact tape adjacent the surface of the electrically conducting member, to form a contact on the electrically conducting member.

More specifically, apparatus for fabricating contacts on elongated electrically conducting spring members of an electrical component as the component is intermittently indexed to move the springs sequentially into position for welding, includes a first shearing member having a shearing edge and a gauging surface engageably by one side of a spring for locating it relative to the shearing edge. A contact tape is fed intermittently so that successive leading end portions of the contact tape each project beyond the shearing edge of the first shearing member and transversely of the spring which is then in position for welding, at a point intermediate the ends of the spring. The leading end portion of the tape then is welded to an intermediate portion of the spring so that the contact tape extends across the spring a preselected distance relative to the one side of the spring. The welded contact tape and spring next are moved relative to the first shearing member to bring the one side of the spring into engagement with the gauging surface of the first shearing member, and a second shearing member then cooperates with the shearing edge of the first shearing member to shear off the welded leading end portion of the contact tape substantially flush with the one side of the spring, to form a contact on the spring.

BRIEF DESCRIPTION OF THE DRAWINGS

FIG. 1 is a front elevational view of the apparatus as viewed in a direction indicated by the line 1–1 in FIG. 2;

FIG. 2 is an enlarged cross-sectional view of the apparatus taken along the line 2–2 of FIG. 1;

FIG. 3 is a partial enlarged cross-sectional view of the apparatus taken along the line 3–3 of FIG. 1;

FIG. 4 is a partial enlarged cross-sectional view of the apparatus taken along the line 4–4 of FIG. 1;

FIG. 5 is an enlarged side elevational view of a portion of the apparatus as viewed along the line 5–5 in FIG. 1;

FIG. 6 is an enlarged partial front elevational view of the apparatus, partially in cross section, showing an operating position of a portion of the apparatus;

FIG. 7 is a view similar to FIG. 6 showing another operating position of the portion of the apparatus shown in FIG. 6;

FIGS. 8, 9, 10, and 11 are enlarged partial front elevational views illustrating various operating stages of a portion of the apparatus;

DETAILED DESCRIPTION

Figure 14:
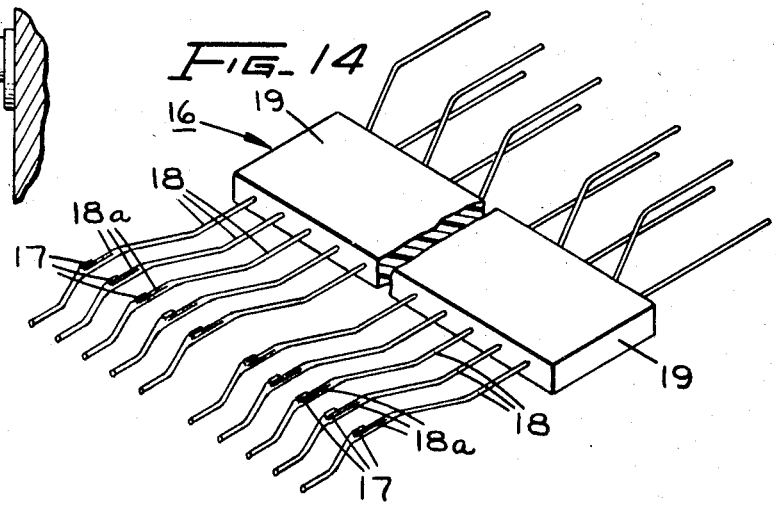
FIG. 14 is an isometric view of a wire spring connector block assembly on which the apparatus shown in the drawings is designed to fabricate contacts.

Referring to FIG. 14, a wire spring connector block assembly 16 on which the illustrated embodiment of the invention is designed to fabricate contacts 17 includes two sets of substantially parallel wire springs 18 embedded in a plastic block 19 and projecting from opposite sides of the block. The contacts 17 are fabricated on coined portions 18a of the wire spring 18 located at points spaced from adjacent ends of the wire springs. Further, as is shown in FIGS. 8—11, each contact 17 is accurately located on the coined portion 18a of its respective wire spring 18 with one side of the contact substantially flush with an adjacent side 18b of the wire spring, and the contact extends across the coined portion a preselected distance, with its opposite side offset relative to an adjacent side 18c of the wire spring.

Figure 12:
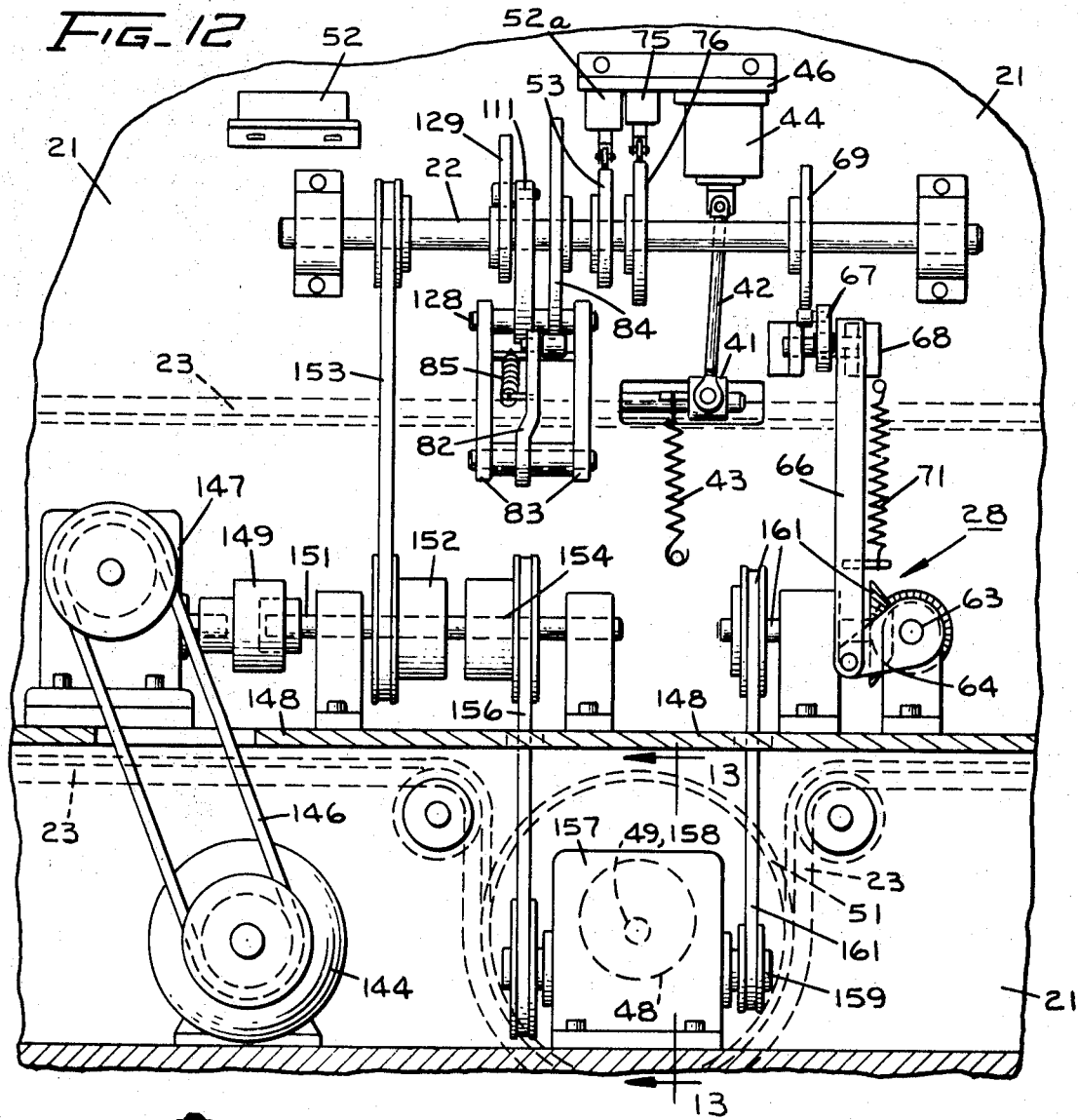
FIG. 12 is a rear elevational view of the apparatus illustrating a drive system for the apparatus.

The disclosed apparatus includes an upstanding main support wall 21 which can be seen extending vertically up the center of FIG. 2. The support wall 21 serves as a support upon which the various parts of the apparatus are mounted and divides the front of the apparatus (FIG. 1 and the right-hand side of FIG. 2) from the back of the apparatus (FIG. 12 and the left-hand side of FIG. 2). A cam shaft 22 (FIGS. 2 and 12) extends horizontally across the back of the apparatus and is journaled in suitable trunnions secured to the back of the vertical support wall 21.

In the illustrated embodiment of the invention, the connector block assemblies 16 are fed in succession into a contact fabricating station disclosed in the drawings, from a suitable dispensing device (not shown) by an intermittently driven conveyor chain 23 at the front of the apparatus. The conveyor chain 23 advances the connector block assemblies 16 from left to right, as viewed in FIG. 1, and travels in a guideway formed by two opposed C-shaped guide rails 24 (FIGS. 2 and 3), with the connector block assemblies riding in a guide track 24a (FIG. 3) formed by recesses in the top surfaces of the guide rails. The conveyor chain 23 has upwardly projecting pusher pins 26 suitably mounted thereon at selected spaced points along its length, the pusher pins extending upward through a slot formed between the C-shaped guide rails 24 for engagement with the connector block assemblies 16. The guide rails 24 are suitably secured together and to a support member 27 (FIG. 2) mounted on the front of the vertical support wall 21.

Referring to the lower portion of FIG. 1, it is seen that the apparatus includes an indexing mechanism 28 for intermittently indexing each connector block assembly 16 through the contact fabricating station horizontally from left to right, as viewed in this figure, after the connector block assembly has been delivered to the station by the conveyor chain 23. During this indexing operation, the drive to the conveyor chain 23 is interrupted in a manner to be described. The indexing mechanism 28 indexes the connector block assembly 16 so as to locate corresponding wire springs 18 of the two sets of wire springs sequentially in adjacent positions 29 in the contact fabricating station for the forming of one of the contacts 17 on each wire spring. In this regard, as viewed in FIG. 1, the contacts 17 are formed on the left-hand set of wire springs 18 by apparatus shown at the left-hand set of wire springs 18 by apparatus shown at the left-hand side of this figure, while the contacts on the right-hand set of wire springs are formed by apparatus which is of reverse construction and which is only partially shown at the right-hand side of this figure.

Associated with each contact forming position 29 is a contact tape feeding mechanism 31 (FIG. 1) for intermittently advancing a contact tape 32 from a supply reel 33 (one shown in FIG. 2) such that, as is illustrated in FIG. 8, the contact tape will extend over each of the wire springs 18 which is indexed into the contact forming position. With the contact tapes 32 so positioned, after the first pair of wire springs 18 have been located in contact forming positions 29 by the the leading mechanism 28, the leading end portion of each contact tape 32 is welded to the coined portion 18a of its respective wire spring 18 by a respective one of two welding mechanisms 34 (FIG. 1) so that the tape extends a preselected distance beyond the side 18b of the wire spring, with the leading edge of the tape and the opposite side 18c of the wire spring in offset relationship, as illustrated in FIG. 9. Subsequently, each contact tape 32 is sheared off by a respective one of two shearing mechanisms 36 (FIG. 1) substantially flush with the side 18b of the wire spring 18 to which it has been welded, as illustrated in FIGS. 10 and 11, so as to form one of the contacts 17 on the wire spring. The indexing mechanism 28 then indexes the connector block assembly 16 to move the first pair of wire springs 18 and the contacts 17 thereon out of the contact forming positions 29, and to move the next pair of wire springs into these positions, whereupon the cycle of operation is repeated. After contacts 17 have been formed on all of the wire springs 18 of the connector block assembly 16, the conveyor chain 23 is reactivated to advance the connector block assembly out of the contact fabricating station, and to advance the next connector block assembly into the station.

Indexing Mechanism

Referring to FIGS. 2, 3, and 4, the indexing mechanism 28 includes a pair of laterally spaced connector block assembly or part locating blades 37 (only one shown) having upwardly projecting forward end portions located adjacent the conveyor chain 23 and having inner end portions secured to an elongated rod 38. The rod 38 is mounted for longitudinal and rotatable movement in suitable brackets 39 on the front of the vertical support wall 21. After each connector block assembly 16 has been advanced into the contact fabricating station by the conveyor chain 23, the rod 38 is rotated counterclockwise in FIG. 2 to move the upwardly projecting forward end portions of the part locating blades 37 between rearwardly extending portions of preselected ones of the wire springs 18 of the connector block assembly, as shown in FIG. 3. The rod 38 is indexed longitudinally to the right in FIG. 1 a selected amount so that the part locating blades 37 push the connector block assembly 16 along the guideway 24a (FIG. 3) and locate the coined portions 18a (FIG. 14) of the first pair of wire springs 18 in the contact forming positions 29. After contacts 17 have been formed on the coined portions 18a of these wire springs 18, the rod 38 is indexed longitudinally an additional increment to locate the coined portions of the next pair of wire springs in the contact forming positions 29 for the fabrication of contacts thereon, this indexing of the connector block assembly 16 being subsequently repeated for each pair of corresponding wire springs. When contacts 17 have been fabricated on all of the wire springs 18 of the connector block assembly 16, the rod 38 is rotated clockwise in FIG. 3 to disengage the part locating blades 37 from the wire springs 18, as shown in FIG. 2. Them as the conveyor chain 23 is driven to advance the completed connector block assembly 16 out of the contact fabricating station and to advance a next connector block assembly into the station, the indexing rod 38 is returned longitudinally to its starting position.

As is best shown in FIG. 2, the rotation of the indexing rod 38 and the part locating blades 37 thereon is accomplished by a mechanism including a lever arm 41 secured adjacent its front end to the rod and extending rearwardly through an aperture in the vertical support wall 21. Adjacent its other end, the lever 41 is universally connected to the lower end of a vertically extending connecting rod 42 and is biased counterclockwise in FIG. 2 by a coil spring 43 connected between the lever and a projecting pin on the back of the vertical support wall 21. Adjacent the upper end of the connecting rod 42, it is pivoted to an armature of a solenoid 44 mounted on the underside of a horizontally projecting shelf 46 secured to the vertical support wall 21.

Figure 13:
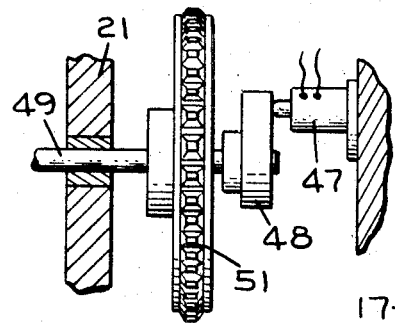
FIG. 13 is an enlarged side elevational view of a portion of the apparatus as viewed along the line 13–13 of FIG. 12.

The solenoid 44 is deenergized to permit the coil spring 43 to cause rotation of the part locating blades 37 into their part-engaging position, in response to the closing of a limit switch 47 (FIG. 13) by a cam 48 mounted on the forward end of a support shaft 49 for a conveyor chain drive sprocket 51 (FIGS. 12 and 13). The solenoid 44 is energized to rotate the locating blades 37 out of their part-engaging position, by a counter 52 (FIG. 12) for counting the number of contact fabricating cycles which have been performed upon each of the connector block assemblies 16. The counter 52 is mounted on the back of the vertical support wall 21 and is advanced in its count at the completion of each contact fabricating cycle, by the closing of a trigger switch 52a on the underside of the horizontally projecting shaft 46. The switch 52a is operated by a cam 53 on the cam shaft 22, and the counter 52 is set to operate and energize the solenoid 44 when the last contact fabricating cycle has been performed on the connector block assembly 16.

As is best shown in FIG. 1, in the illustrated embodiment of the invention a mechanism for causing longitudinal movement of the indexing rod 38 includes a slide member 54 mounted for longitudinal reciprocal movement on a guide rod 56, the guide rod being fixedly mounted adjacent its opposite ends in brackets 57 (only one shown) secured to the front of the vertical support wall 21. The slide 54 includes an upwardly projecting arm 58 having a portion adjacent its upper end through which the indexing rod 38 extends so that the rod is rotatable relative to the arm. Longitudinal movement of the indexing rod 38 in the upper portion of the arm 58 is precluded by stop collars 59 secured to the rod on opposite side of the upper portion. The slide 54 is movable to the right in FIG. 1 against the action of a coil return spring 61 by an intermittently driven indexing cam 62 having a suitably stepped periphery and engaged with a cam follower on the slide. The indexing cam 62 is fixedly carried on a shaft 63 which is journaled in the vertical support wall 21 and which extends rearwardly thereof, as shown in FIG. 2. As the indexing cam 62 is intermittently rotated, it moves the slide 54 and the indexing rod 38 longitudinally to the right in FIG. 1 in successive increments as above described. When the last pair of wire springs 18 of one of the connector block assemblies 16 has had contacts 17 formed thereon the indexing cam 62 is rotated an additional amount to complete a 360 degree revolution, thereby bringing it back to its initial starting position, the periphery of the cam being such that during this rotation it permits the coil spring 61 to return the slide 54 and the indexing rod 38 to their initial positions. If desired, the indexing cam 62 may be releasably locked in each of its stationary positions during the contact fabricating operation in a suitable manner, not shown, such as by the provision of a spring-biased detent engageable in recesses in one side of the cam or in recesses in a second member mounted on the cam's support shaft 63 for rotation therewith.

Referring to FIGS. 2 and 12, intermittent rotation of the indexing cam 62 is provided by a suitable stepping mechanism 64, such as a one-way clutch or a pawl and ratchet, on its support shaft 63 at the back of the apparatus. In this regard, an operating member of the stepping mechanism 64 is pivotally connected to a lower end portion of a vertical operating rod 66 and the rod is connected adjacent its upper end by means of a pin and slot connection to an operating lever 67 intermediate the ends of the lever. The lever 67 is pivotally mounted adjacent one end in brackets 68 on the back of the vertical support wall 21 and adjacent its other end carries a cam follower which is engaged with a suitable cam 69 on the cam shaft 22. The operating rod 66 is biased upward by a coil spring 71 connected between an arm on the rod and a pin on the vertical support wall 21, and is intermittently moved downward by the lever 67 and the cam 69 against the action of the coil spring to effect operation of the stepping mechanism 64 in a well-known manner.

Welding Mechanism

Referring next to the welding mechanisms 34, since they are identical, except for being of reverse construction, only the mechanism associated with the contact forming position 29 at the left-hand side of the apparatus, as viewed in FIG. 1, will be describe in detail. As is illustrated in FIG. 8, the indexing of one of the wire springs 18 into the contact forming position 29 locates it between an upper electrode 72 and a lower electrode 73 of the welding mechanism 34. The lower electrode 73 then is moved vertically upward toward the upper electrode 72 to engage the wire spring 18, and a bifurcated locating finger 74 moves with the lower electrode to trap the wire spring between its furcations and in alignment with the electrodes. As is shown in FIG. 9, after the lower electrode 73 engages the wire spring 18 it is moved further upward to flex the wire spring upward until the coined portion 18a thereon engages a leading end portion of the contact tape 32 and so that the contact tape end portion and the wire spring coined portion are gripped firmly between the electrodes 72 and 73, with the contact tape extending a preselected distance beyond the side 18b of the wire spring. A welding circuit then is closed through the welding electrodes 72 and 73 from a suitable power source (not shown), to effect welding of the leading end portion of the contact tape 32 to the coined portion 18a of the wire spring 18, after which the lower electrode 73 is retracted, as illustrated in FIG. 10. The opening and closing of the welding circuit is accomplished by the actuation of a trigger switch 75 (FIGS. 2 and 12) mounted on the underside of the horizontally projecting shelf 46 at the back of the apparatus, the trigger switch being operated by a suitable cam 76 on the cam shaft 22.

Referring to FIGS. 1, 2, and 3, the lower electrode 73 is removably mounted in a recess in an electrode holder 77 of a suitable electrically conducting material, such as copper, by a clamp plate 78, the clamp plate and the adjacent wire spring locating finger 74 being secured to the holder by suitable screws. The holder 77 is mounted in a recess in a mounting block 79 of a suitable insulting material, such as plastic, and has an electrical cable 81 connected thereto, the electrical cable being connected to the above-mentioned electrical power source.

The mounting block 79 is common to both of the welding mechanisms 34 and, as is best shown in FIG. 2, is secured on an upper forward end portion of a lift arm 82 by suitable screws. The arm 82 extends rearwardly through an opening in the vertical support wall 21 and is pivoted intermediate its ends on a pin having opposite end portions thereof mounted in apertures in a pair of laterally spaced and rearwardly projecting plates 83, the plates being suitably secured to the back of the vertical support wall 21. The lift arm 82 carries a cam follower which is engaged with a suitable cam 84 on the cam shaft 22 for moving the lift arm and the lower electrodes 73 counterclockwise in FIG. 2 into welding position. The lift arm 82 is biased clockwise in FIG. 2 out of the welding position by a coil spring 85 connected between the arm and a pin mounted between the plates 83.

Referring to FIG. 1, it is seen that the apparatus includes a slide assembly 86 at each side of the apparatus and each welding mechanism 34 includes an upper electrode holder 87 (only one shown) which forms a part of a respective one of the slide assemblies. As is illustrated in FIGS. 5—11, the upper electrode holder 87 has a vertical slot 87a therein, in which its upper electrode 72 is received. Adjacent its lower end upper electrode 72 includes a stepped portion 72a (best shown in FIGS. 8—11) which provides a horizontally extending surface for engaging a stop pin 88 mounted laterally across the vertical slot 87a so as to prevent the contact tape from being bent downward by the upper electrode. At its lower end the upper electrode 72 is provided with a guide groove 72b (FIG. 5) in which the contact tape 32 is retained throughout the feeding, welding and shearing thereof, as will subsequently become apparent. As is best shown in FIGS. 1, 2, and 4, the upper electrode holder 87 is suitably secured to the front of a plate member 89 of the slide assembly 86 and a horizontally reciprocable slide member 91 of the slide assembly has a lower forwardly projecting portion 91a (FIGS. 2 and 4) on which the plate member is fixedly mounted.

The upper electrode 72 is urged downward in the vertical slot 87a in the holder 87 and against the stop pin 88 by a biasing lever 92 of a suitable electrically conducting material and having a downwardly extending projection 92a adjacent its right-hand end (as viewed in FIG. 1) and engageable with the top of the electrode. Adjacent its other end the biasing lever 92 is received in a slot in a head of a shaft member 93 of insulating material, the biasing lever being secured in the slot by suitable screws which also connect an electrical cable 94 from the above-mentioned power source to the biasing lever. Adjacent its electrode engaging end the biasing lever 92 is received between upwardly projecting furcations of a guide member 96 (FIGS. 1 and 4) of insulating material and screw threadably mounted adjacent its lower end in the upper electrode holder 87.

The shaft member 93 is journaled in the plate member 89 an projects rearwardly therefrom. As is best shown in FIGS. 2 and 4, an upper electrode locking lever 97 is secured on this rearwardly projecting shaft portion between the plate member 89 and a main body portion of the slide 91, by a pin 98. The locking lever 97 extends to the right in FIGS. 1 and 4 so that an end portion thereof is vertically beneath a piston rod of a vertically disposed air cylinder 99. The air cylinder 99 is supported on a suitable bracket 101, which is pivotally mounted adjacent its lower end on the slide 91 between the main body portion of the slide and the plate member 89. The bracket 101 is releasably locked in its upright position as shown in FIG. 1, by a spring biased ball detent 102 mounted on the bracket and engageable in a recess in the main body portion of the slide 91. Thus, upon the introduction of air under proper pressure into the upper end of the cylinder from a suitable supply source (not shown) the piston rod of the air cylinder will urge the locking lever 97, the shaft member 93, and the biasing lever 92 clockwise in FIG. 1 to retain the upper electrode 72 in the vertical slot 87a of its holder 87 and provide the necessary force on the upper electrode to achieve satisfactory welding. When the air to the air cylinder 99 is turned off the cylinder and its bracket 101 can be pivoted clockwise in FIG. 1 about the pivotal axis of the bracket into a position whereby the locking lever 97, shaft member 93, and baising lever 92 can be pivoted counterclockwise to permit removal of the upper electrode 72 for maintenance purposes.

Contact Tape Feeding Mechanisms

Referring now to the contact tape feeding mechanisms 31 on the opposite sides of the apparatus, since they also are of identical reverse construction, only the one shown in the drawings for the left-hand side of the apparatus, as viewed in FIG. 1, will be described. In this regard, each slide assembly 86, in addition to carrying parts of one of the welding mechanisms 34, forms a part of a respective one of the contact tape feeding mechanisms 31.

As is best shown in FIGS. 2 and 4, the slide 91 of each slide assembly 86 receives a horizontally extending guide rod 103 therethrough so that the slide member is horizontally reciprocable on the rod. As viewed in FIG. 4, the left-hand end of the rod 103 is fixedly mounted in a bracket 104 and the right-hand end of the rod is fixedly mounted in a support block 106, the bracket and the support block being secured to the front of the vertical support wall 21 and projecting forwardly therefrom.

The slide assembly 86 is biased to the right in FIG. 4 by a coil spring 107 connected between the support block 106 and a pin on the slide member 91. A mechanism for moving the slide assembly 86 to the left in FIG. 4 against the action of the coil spring 107 includes an operating rod 108 adjustably secured to the slide member 91 by screws 109 and slidably extending through a passage in the support block 106. Adjacent the right-hand end of the operating rod 108, as viewed in FIG. 4, a cam follower on the rod is engageable by a camming surface 111a on a shear operating arm 111 common to both of the shearing mechanisms 36. The left-hand end of the operating rod 108 is engaged by an adjusting screw 112, which screw threadably extends through an upstanding portion of the slide 91 and which has a lock nut 113 provided thereon in a well-known manner. By adjustment of the position of the operating rod 108 longitudinally relative to the slide 91 and by adjusting the position of the adjusting screw 112 relative to the adjacent end of the operating rod, the stroke of the slide and thus the length of contact tape 32 fed into welding position on each cycle of the apparatus can be controlled, as will subsequently become apparent.

The contact tape 32 is fed from the continuous supply reel 33 (FIG. 2) on the back of the vertical support wall 21 downward through a guide tube 114 and about a curved guide member 116. The curved guide member 116, which is of a suitable wear-resistant insulating material, such as plastic, has an arcuate tape-receiving groove formed therein and is secured to the front of the plate member 89 below the head of the shaft member 93. From the tape receiving groove in the guide member 116 the contact tape 32 passes to a forwardly projecting shelf portion 89a FIG. 1) of the plate member 89. The contact tape 32 then travels in a guideway formed initially by opposed grooves in the shelf portion 89a and the underside of the upper electrode holder 87, and subsequently by opposed grooves in the underside of the upper electrode holder and a forwardly projecting shearing portion 117a of a lower shearing member 117 of the respective shearing mechanism 36. Finally, adjacent its leading end the contact tape 32 extends linearly into the guide groove 72b (FIG. 5) of the upper electrode 72.

A contact tape hitch feed 118 (FIG. 1) of a suitable type is provided on the plate member 89 of the slide assembly 86, and in the illustrated embodiment of the invention includes a pawl 119 pivoted adjacent its upper end on the shank of a pin 121 which is screw threadably mounted in the plate member. The lower end of the pawl 119 includes a tape-receiving groove in opposed relationship to the groove in the shelf portion 89a of the plate member 89, and the pawl is spring biased clockwise, as viewed in FIG. 1, by a coil spring 122 connected between the pawl and a pin on the plate member.

Contact Tape Shearing Mechanisms

As is best shown in FIG. 3, the lower shearing member 117 of each of the contact tape shearing mechanisms 36 is secured by suitable screws to a forwardly projecting portion of the respective support block 106. Each shearing mechanism 36 also includes an upper shearing member 123, the upper shearing members being movable vertically downward relative to and past the lower shearing members 117 in a shearing operation, as illustrated in FIG. 11 for the left-hand side of the apparatus.

As described hereinabove, after the leading end portion of each contact tape 32 has been welded to the coined portion 18a of one of the wire springs 18, as illustrated in FIGS. 8 and 9, the lower electrode lifting cam 84 (FIG. 2) permits the coil spring 85 to pivot the lower electrode lift arm 82 so as to move each of the lower electrodes 73 back to its lower initial position. At substantially the same time, each slide assembly 86 is moved from a forward position as illustrated in FIGS. 6 and 9, toward a retracted position as illustrated in FIGS. 7 and 10, by the respective cam surface 111a on the shear operating arm 111. During this movement the hitch feed pawl 119 carried on the slide assembly 86 grips its associated contact tape 32 so that the contact tape and the wire spring 18 to which it has been welded, move with the slide assembly relative to a shearing edge 117b of the adjacent lower shearing member 117, until their movement is stopped by the side 18b of the wire spring coming in contact with a gauging surface 117c of the shearing member. The shear operating arm 111, however, continues to move the slide assembly 86 an additional distance to cause movement of the upper electrode 72 carried by the slide assembly relative to the contact tape 32 and the wire spring 18, with the hitch feed spring 122 now permitting the pawl 119 to pivot and ride over the contact tape. When the upper electrode 72 has been moved into a position just beyond the shearing edge 117b, as shown in FIGS. 7 and 10, continued pivotal movement of the shear operating arm 111 causes the respective downwardly moving upper shearing member 123 and a shearing edge 123a thereof to move past the upper electrode 72 and the shearing edge 117b, as illustrated in FIG. 11, to shear the contact tape 32 substantially flush with the adjacent side 18b of the wire spring 18, thus forming one of the contacts 17 thereon. The flexed wire spring 18, with the formed contact 17, then returns to its initial position as indicated in dashed lines in FIG. 11. To facilitate the shearing of the contact tapes 32, each upper shearing member 123 has a contact-tape receiving groove 123b formed in its lower side.

The shear operating arm 111 next is retracted to move the upper shearing members 123 upward, and to permit the slide assemblies 86 to be returned to their advanced positions by their drive springs 107 (FIG. 4), to feed the next increments of the contact tapes 32 and to position the upper electrodes 72 in readiness for the next contact fabricating operation. The indexing mechanism 28 then indexes the connector block assembly 16 to move the next pair of wire springs 18 into the contact forming positions 29 (FIG. 1) and to move the just completed wire springs out of the contact forming positions.

Referring to FIGS. 1, 3, and 4, it is seen that a slide 124, for carrying the upper shearing members 123, is mounted for movement on an inclined support plate 126 and in a guideway formed by a pair of laterally spaced rails 127 secured to the front of the support plate. The slide 124 is reciprocated in the guideway by the shear operating arm 111, which projects rearwardly through a slot in the vertical support wall 21. The shear operating arm is pivotally mounted on a pin 128 (FIG. 2) having opposite end portions force fitted in the plates 83 on the back of the vertical support wall 21 and adjacent its rearward end carries a cam follower which is engaged with a suitable cam 129 on the cam shaft 22. The front end portion of the operating arm 111 is in the form of a bifurcated guideway for a slidable member 131 having a connector pin 132 journaled therein. The pin 132 has opposite end portions force-fitted into apertures in spaced legs of a connector member 133 secured to the front of the slide 124 by suitable screws. The slide 124 is biased upward by a coil spring 134 suitably connected between the connector member 133 and the vertical support wall 21.

As is best shown in FIGS. 1, 3, and 4, the upper shearing members 123 are secured to the front of the slide 124 adjacent lower opposite corners thereof by respective clamp plates 136 and screws 137. The screws 137 for each of the upper shearing members 123 extend through the clamp plate 136 and adjusting slots in the upper shearing member, and are screw threaded at their inner ends into a spacer member 138 (FIG. 3) located between the shearing member and the slide 124. The spacer member 138 is secured to the slide 124 by screws 139 (FIG. 3). Adjustment of each upper shearing member 123 in a front to back direction is accomplished by a vertically movable wedge member 140 of an inverted U-shape and which straddles the spacer member 138 and a central portion of the shearing member. Legs of the wedge member 140 include camming surfaces 140a (FIG. 3) in complementary engagement with camming surfaces on the upper shearing member 123 and the wedge member has an adjustment screw 141 engaged with its top and screw threadably mounted in a laterally projecting lug portion of the connector member 133.

Similarly, the upper shearing members 123 are adjustable indexing relative to the shearing edges 117b of the lower shearing members 117, by a vertically movable wedge member 142 positioned therebetween. The wedge member 142 has side camming surfaces 142a (FIG. 1) in complementary engagement with respective camming surfaces on the upper shearing members 123 and has an adjustment screw 143 engaged with its upper end and screw threadably mounted in the connector member 133 between the legs thereof.

Drive System

The cam shaft 22, conveyor chain 23, and indexing mechanism 28 may be driven in any suitable manner. For example, referring to FIG. 12, it is seen that in the illustrated embodiment of the invention an electric motor 144 is provided behind the vertical support wall 21 and is connected by a belt and pulley drive 146 to a gear reduction mechanism 147 supported on an elevated horizontal platform 148. The platform 148 projects rearwardly from the vertical support wall 21 and is suitably secured thereto, and the gear reduction mechanism 147 is connected through a coupler 149 to a drive shaft 151 mounted in upstanding trunnions on the platform.

The cam shaft 22 is driven from the drive shaft 151 through an electromagnetic clutch 152 and a chain and gear drive 153. The drive shaft 151, through another electromagnetic clutch 154 and a chain and gear drive 156, also is drivingly connected to an input shaft of a gearbox 157. The gearbox 157 includes a first output shaft 158 which is drivingly connected to the support shaft 49 (FIG. 13) for the conveyor chain drive sprocket 51, and a second output shaft 159 which is connected to drive the support shaft 63 of the indexing cam 62 through a suitable drive train 161.

When the last contact fabricating cycle has been completed on one of the connector block assemblies 16, the counter 52 (FIG. 12) operates and through suitable circuitry (not shown) causes deenergization of the electromagnetic clutch 152, thereby interrupting the driving of the cam shaft 22 by the motor 144. The counter 52 also causes energization of the electromagnetic clutch 154 so that the motor 144 drives the conveyor chain 23 to advance the connector block assemblies 16 along the guide track 24a, and drives the indexing cam 62 around to its starting position. Subsequently, referring to FIG. 13, the cam 48 on the support shaft 49 for the conveyor chain drive sprocket 51 closes the limit switch 47 to cause deenergization of the electromagnetic clutch 154, thereby interrupting the drive to the conveyor chain 23 and the indexing cam 62, and to cause energization of the electromagnetic clutch 152, whereby the cam shaft 22 again is driven by the motor 144.

Operation

Summarizing the operation of the apparatus, the motor 144 (FIG. 12) drives the drive shaft 151 continuously through the belt and pulley drive 146, the gear reduction mechanism 147, and the coupler 149. The drive shaft 151 then is alternately connected to drive the conveyor chain 23 at the front of the apparatus and thereby feed the connector block assemblies 16 (FIG. 14) in succession into the contact fabricating station shown in the drawings, and to drive the cam shaft 22 for the fabricating the contacts 17 on the wire springs 18 of each of the connector block assemblies when it is in the contact fabricating station.

More specifically, as one of the connector block assemblies 16 is being advanced along the guideway 24a (FIGS. 1, 2, and 3) by the conveyor chain 23 and into the contact fabricating station, the electromagnetic clutch 152 (FIGS. 12) is in a deenergized state whereby the cam shaft 22 is not being driven by the drive shaft 151. The electromagnetic clutch 154, however, is energized so that the conveyor chain 23 is being driven by the driven shaft 151 through the chain and gear drive 156, the output shaft 158 of the gear box 157, the shaft 49, and the conveyor chain drive sprocket 51. At the same time the indexing cam 62 (FIG. 1) of the indexing mechanism 28 is being driven from the second output shaft 159 of the gearbox 157, through the drive system 161, to a "zero" or starting position.

The conveyor chain 23 is driven until the cam 48 (FIG. 13) on its drive sprocket support shaft 49 operates the limit switch 47. The operation of the limit switch 47 causes deenergization of the electromagnetic clutch 154 to interrupt the drive to the conveyor chain 23 and the indexing cam 63, and energization of the electromagnetic clutch 152, whereby the drive shaft 151 begins to rotate the cam shaft 22 through the chain and gear drive 153.

After each connector block assembly 16 has been delivered to the contact fabricating station by the conveyor chain 23, the indexing mechanism 28 begins to index the connector block assembly along the guideway 24a to position the corresponding pairs of the wire springs 18 of the connector block assembly sequentially in the two contact forming positions 29 (FIG. 1). In this connection, the operation of the limit switch 147 also causes deenergization of the solenoid 44 (FIGS. 2 and 12) at the back of the apparatus, whereby the coil spring 43 rotates the lever arm 41, the indexing rod 38 and the part locating blades 37 counterclockwise in FIG. 2, to move the upwardly projecting forward end portions of the blades between preselected ones of the wire springs 18, as shown in FIG. 3. The cam 69 (FIG. 12) on the cam shaft 22 then operates the stepping mechanism 64 on the shaft 63, through the connecting rod 66 and the lever 67, to cause an incremental rotation of the indexing cam 62 (FIG. 1) at the front of the apparatus. As the indexing cam 62 rotates it pushes the slide 54 and its upstanding arm 58 to the right in FIG. 1, to move the indexing rod 38 and the part locating blades 37 to the right in this FIG. so that the blades push the connector block assembly 16 along the guideway 24a and position the coined portions 18a of the first pair of wire springs 18 in the contact forming positions 29.

As is best shown in FIG. 8, the part locating blades 37 of the indexing mechanism 28 position each wire spring 18 in a respective one of the contact forming positions As is best shown in FIG. 8, the part locating blades 37 of the indexing mechanism 28 position each wire spring 18 in a respective one of the contact forming positions 29 between the upper an lower welding electrodes 72 and 73 of the welding mechanism 34 for that position. Referring to FIG. 2, the cam 84 on the cam shaft 22 then pivots the lower electrode lift arm 82 counterclockwise in this figure to move the lower electrodes 73 and the bifurcated locating fingers 74 upward toward the upper electrodes 72. During the initial portion of this movement each of the locating fingers 74 traps the adjacent wire spring 18 between its furcations and in vertical alignment with its associated upper and lower electrodes 72 and 73. Subsequently, as is illustrated in FIG. 9, the upwardly moving lower electrode 73 engages the wire spring 18 and flexes it upwardly so that the pointed portion 18a thereof engages the leading end portion of the associated contact tape 32 and so that the leading end portion of the contact tape and the coined portion of the wire spring are firmly gripped between the electrodes 72 and 73, with the contact tape extending beyond the side 81b of the wire spring a preselected distance. The cam 76 (FIGS. 2 and 12) on the cam shaft 22 then closes the trigger switch 75 to complete a welding circuit through both sets of the electrodes 72 and 73 from the above-mentioned electrical power source (not shown).

The cam 129 on the cam shaft 22 next begins to pivot the shear operating arm 111, which is common to both of the shearing mechanisms 36, clockwise in FIG. 2. During the initial portion of this movement the shear operating arm 111 causes movement of the slide assemblies 86 at each side of the apparatus to their retracted outer positions. More specifically, as is illustrated in FIGS. 4, 6, and 7 for the slide assembly 86 at the left-hand side of the apparatus, as viewed in FIG. 1, the respective cam surface 111a on the shear operating arm 111 moves the operating rod 108, and thus the slide assembly, to the left in these figures from a position as shown in FIG. 6 to a position as shown in FIG. 7. As the slide assembly 86 initially moves to the left, the spring biased pawl 119 of the hitch feed 118 frictionally grips the contact tape 32 such that the contact tape and the wire spring 18 welded thereto are pulled along with the slide assembly. Subsequently, as is best shown in FIG. 10, the side 18b of the wire opening 18 contacts the gauging surface 117c of the adjacent lower shearing member 117, whereupon movement of the contact tape 32 and the wire spring is stopped, with the coil spring 122 of the hitch feed 118 permitting the pawl 119 to pivot and ride over the contact tape. The movement of the slide assembly 86 continues until the upper electrode holder 87 and the upper electrode 72 carried thereby have cleared the shearing edge 117b of the lower shearing member 117, as illustrated in FIGS. 7 and 10, and until the pawl 119 has moved over the tape 32 the distance necessary to provide the required contact tape feed on the next operating cycle.

As the shear operating arm 111 is pivoted by its operating cam 129, it also moves the slide 124 and the upper shear members 123 thereon vertically downward so that the upper shearing members cooperate with their respective lower shearing members 117 to shear off the contact tapes 32 and thereby form contacts 17 on the wire springs 18. In this connection, referring to FIG. 11, which illustrates a shearing operation for the left-hand side of the apparatus, as viewed in FIG. 1, after the upper electrode holder 87 and the upper electrode 72 have moved beyond the shearing edge 117b of the lower shearing member 117, and thus out of the path of the upper shearing member 123, the continued pivotal movement of the shear operating arm 111 causes the upper shearing member 123 and its shearing edge 123a to move downward past the shearing edge 117b, thereby shearing off the contact tape 32 substantially flush with the adjacent side 18b of the wire spring 18. The flexed wire spring 18, with the contact 17 which has been formed thereon, then springs back to its initial position as shown in dashed lines in FIG. 11.

The operating cam 129 for the shear operating arm 111 now permits the coil return spring 134 for the slide 124 to move the slide vertically upward, thereby moving the upper shearing members 123 back to their original upper positions in preparation for the next contact fabricating cycle. This upward movement of the slide 124 also causes pivoting of the shear operating arm 111 counterclockwise in FIG. 2 back to its original position. As this occurs the camming surfaces 111a on the shear operating arm 111 permit the coil return springs 107 to move the slide assemblies 86 toward one another and into their initial advanced positions for the next contact fabricating cycle.

More specifically, as each slide assembly 86 is moved to its advanced position the upper electrode holder 87 and the upper electrode 72 carried thereby, move relative to the adjacent lower shearing member 117 so that the upper electrode is located above its respective lower electrode 73 and in position for the next welding operation. Further, as the slide assembly 86 is advanced the hitch feed pawl 119 carried thereby grips the contact tape 32 so as to advance it from the supply reel 33 (FIG. 2) and with the upper electrode 72, into position for the next welding operation.

The indexing mechanism cam 69 on the cam shaft 22, through the stepping mechanism 64, then causes rotation of the indexing cam 62 and indexing of the connector block assembly 16 an additional increment along the guideway 24a, so as to move the first pair of wire springs 18 and the formed contacts 17 thereon out of the contact fabricating positions 29, and so as to move the next pair of wire springs into the contact forming positions, as above described, whereupon the contact fabricating cycle is repeated. Preferably, the indexing of the connector block assembly 16 is started as soon as the shearing operation has been completed.

As each contact fabricating cycle is completed, the cam 53 on the cam shaft 22 operates the counter switch 52a to advance the counter 52 one count. When the last contact fabricating cycle is recorded on the counter 52, it operates to energize the solenoid 44. The energized solenoid 44, through the operating lever 41 and the connecting rod 42, then rotates the indexing rod 38 to pivot the part locating blades 37 clockwise in FIG. 3 from between the wire springs 18 as shown in this figure to their position as shown in FIG. 2. The counter 52 also causes deenergization of the electromagnetic clutch 152 to interrupt the drive to the cam shaft 22, and energization of the electromagnetic clutch 154 to connect the conveyor chain 23 and the indexing can 62 to the drive shaft 151. The conveyor chain 23 is driven to advance the completed connector block assembly 16 out of the contact fabricating station and to advance the next connector block assembly into the station, while the indexing cam 62 is driven through an additional arc so that it completes a 360° revolution to bring it back to its "zero" or starting position. During this rotation of the indexing cam 62 it permits the coil spring 61 to return the indexing slide 54, 58 and thus the indexing rod 38 and the part locating blades 37, back to their initial positions in readiness for the fabrication of contacts 17 on the next connector block assembly 16.

We claim:

1. Apparatus for fabricating a contact on an elongated electrically conducting member which is flexible in nature, which comprises:

first and second shearing members each having a shearing edge and movable relative to one another in a shearing operation, said first shearing member also having a gauging surface for locating the electrically conducting member relative to its shearing edge;

means for feeding a contact tape transversely with respect to the elongated electrically conducting member so that a leading end portion of the tape projects beyond the shearing edge of said first shearing member into position for welding;

means for welding the leading end portion of the contact to the electrically conducting member so that the contact tape extends over the electrically conducting member a preselected distance relative to a side surface thereof;

means for causing movement of the welded contact tape and flexing of the electrically conducting member relative to said first shearing member to bring the side surface of the electrically conducting member into engagement with the gauging surface of said first shearing member; and means for causing relative movement between said first and second shearing members so that the shearing edges of said shearing members cooperate to shear off the welded leading end portion of the contact tape adjacent the side surface of the electrically conducting member, to form a contact on the electrically conducting member.

2. Apparatus as recited in claim 1, in which:

the shearing edges of said shearing members shear off the leading end portion of the contact tape substantially flush with the side surface of the electrically conducting member.

3. Apparatus as recited in claim 1, in which:

said contact tape feeding means feeds the contact tape transversely with respect to the elongated electrically conducting member so that the leading end portion of the contact tape projects adjacent a portion of the electrically conducting member intermediate the ends of the electrically conducting member; and said welding means welds the leading end portion of the contact tape to the intermediate portion of the electric electrically conducting member.

4. Apparatus as recited in claim 1, in which:

said welding means includes a welding electrode having a guide groove in which the contact tape is received throughout the feeding, welding and shearing of the contact tape.

5. Apparatus for fabricating contacts on elongated, relatively flexible electrically conducting members of an electrical component, which comprises:

means for intermittently indexing the electrical component so as to move the electrically conducting members of the component sequentially into position for welding;

first and second shearing members each having a shearing edge and movable relative to one another in a shearing operation, said first shearing member also having a gauging surface for locating an electrically conducting member of the electrical component relative to its shearing edge;

means for intermittently feeding a contact tape so that successive leading end portions of the contact tape each project beyond the shearing edge of said first shearing member transversely and in spaced relationship with respect to the elongated electrically conducting member which is then in position for welding;

means for welding each leading end portion of the contact tape to the electrically conducting member which is then in position for welding so that the contact tape extends across the electrically conducting member a preselected distance relative to a side surface thereof, said welding means including means for engaging and flexing the electrically conducting member from a normal position into engagement with the leading end portion of the contact tape during the welding operation;

means for causing movement of the welded contact tape and flexing of the electrically conducting member relative to said first shearing member to bring the side surface of the electrically conducting member into engagement with the gauging surface of said first shearing member; and means for causing relative movement between said first and second shearing members so that the shearing edges of said shearing members cooperate to shear off the welded leading end portion of the contact tape adjacent the side surface of the electrically conducting member, to form a contact on the electrically conducting member.

6. Apparatus as recited in claim 5 in which:

said intermittent feeding means feeds the contact tape transversely with respect to the electrically conducting member adjacent a portion of the electrically conducting member intermediate its ends; and said welding means welds the leading end portion of the contact tape to the intermediate portion of the electrically conducting member.

7. Apparatus for fabricating a contact on an electrically conducting member, which comprises:

first and second shearing members each having a shearing edge and movable relative to one another in a shearing operation, said first shearing member also having a gauging surface for locating the electrically conducting member relative to its shearing edge;

means for feeding a contact tape so that a leading end portion of the tape projects beyond the shearing edge of said first shearing member into position for welding;

means for welding the leading end portion of the contact tape to the electrically conducting member so that the contact tape extends over the electrically conducting member a preselected distance relative to a surface thereof;

means for causing movement of the welded contact tape and the electrically conducting member relative to said first shearing member to bring the surface of the electrically conducting member into engagement with the gauging surface of said first shearing member;

means for causing relative movement between said first and second shearing members so that the shearing edges of said shearing members cooperate to shear off the welded leading end portion of the contact tape adjacent the surface of the electrically conducting member, to form a contact on the electrically conducting member;

a welding electrode which forms a part of said welding means; and means for causing relative movement between said welding electrode and said first shearing member in a direction transverse to the direction of relative movement of said first and second shearing members, such that said welding electrode is positioned to one side of the shearing edge of said first shearing member for welding of the leading end portion of the contact tape to the electrically conducting member, and is positioned to an opposite side of the shearing edge of said first shearing member during the shearing of the contact tape by said shearing members.

8. Apparatus as recited in claims 7 in which:

said welding electrode is provided with a guide groove in which the contact tape is received throughout the feeding, welding and shearing of the contact tape.

9. Apparatus for fabricating contacts on elongated electrically conducting members of an electrical component, which comprises:

means for intermittently indexing the electrical component so as to move the electrically conducting members of the component sequentially into position for welding;

first and second shearing members each having a shearing edge and movable relative to one another in a shearing operation, said first shearing member also having a gauging surface for locating an electrically conducting member of the electrical component relative to its shearing edge;

means for intermittently feeding a contact tape so that successive leading end portions of the contact tape each project beyond the shearing edge of said first shearing member into position for welding and transversely with respect to the elongated electrically conducting member which is then in position for welding;

means for welding each leading end portion of the contact tape to the electrically conducting member which is then in position for welding so that the contact tape extends across the electrically conducting member a preselected distance relative to a side surface thereof, said welding means including first and second relatively movable electrodes, said first electrode and said first shearing member being located on one side of a predetermined path of travel of the electrically conducting members as the electrical component is indexed by said indexing means, and said second electrode and said second shearing member being located on the opposite side of the predetermined path of travel of the electrically conducting members;

means for causing movement of the welding contact tape and the electrically conducting member relative to said first shearing member to bring the side surface of the electrically conducting member into engagement with the gauging surface of said first shearing member;

means for causing relative movement between said first and second shearing members so that the shearing edges of said shearing members cooperate to shear off the welded leading end portion of the contact tape adjacent the side surface of the electrically conducting member to form a contact on the electrically conducting member; and means for causing relative movement between said first shearing member and said second welding electrode substantially parallel to the predetermined path of travel of the electrically conducting members, such that said second welding electrode is positioned to one side of the shearing edge of said first shearing member for welding of a leading end portion of the contact tape and an electrically conducting member, and is positioned to the opposite side of the shearing edge of said first shearing member during the shearing of the contact tape by said shearing members.

10. Apparatus as recited in claim 9, in which the electrically conducting members are flexible springs and in which:

said first welding electrode is movable to engage and flex each of the springs when the spring is in position for welding, from a normal position into engagement with the leading end portion of the contact tape and so that the leading end portion of the contact tape and the spring are gripped between said first and second electrodes.

(6-69)

UNITED STATES PATENT OFFICE
CERTIFICATE OF CORRECTION

Patent No. 3,575,570      Dated April 20, 1971

Inventor(s) J. S. Gellatly-J. C. Houda, Jr. (Case 6-10)

It is certified that error appears in the above-identified patent and that said Letters Patent are hereby corrected as shown below:

Column 1, line 33, "is" second occurrence should read --it--.
Column 2, line 38, "engageably" should read --engageable--.
Column 3, lines 68-69, delete "by apparatus shown at the left hand set of wire springs 18". Column 4, line 6, "the" should precede "contact". Column 4, line 6, omit "the" second occurrence. Column 4, line 6, "leading" should read --index--.
Column 4, line 44, "then" should precede "indexed". Column 4, line 60, "Them" should read --Then--. Column 5, line 16, "shaft" should read --shelf--. Column 5, line 33, "side" should read --sides--. Column 6, line 5, "describe" should read --described--. Column 7, line 18, "an" should read --a--.
Column 9, line 66, "indexing" should read --sideways--.
Column 10, line 50, "of" should follow "fabricating". Column line 56, "FIGS." should read --FIG.--. Column 11, line 8, "; should read --47--. Column 11, lines 25 through 27, omit.
Column 11, line 32, "an" should read --and--. Column 11, li "pointed" should read --coined--. Column 11, line 48, "81b" should read --18b--. Column 12, line 74, "can" should read --cam--. Column 13, line 26, "tape" should follow "contact" Column 13, line 54, omit "electric".

Signed and sealed this 28th day of September 1971.

(SEAL)
Attest:

EDWARD M. FLETCHER, JR.
Attesting Officer

ROBERT GOTTSCHALK
Acting Commissioner of Patent